J. H. DODSON.
TRAP.
APPLICATION FILED MAY 6, 1914.
1,222,191.
Patented Apr. 10, 1917.
2 SHEETS—SHEET 1.
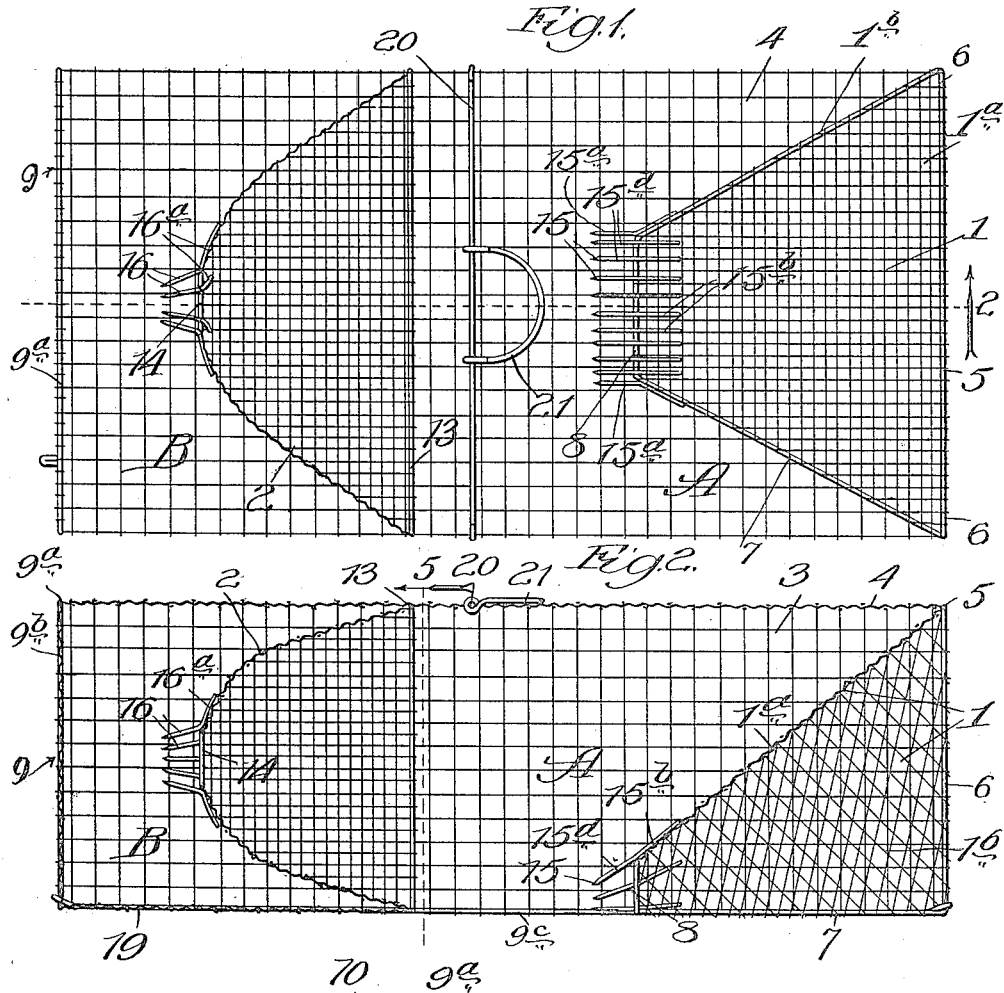
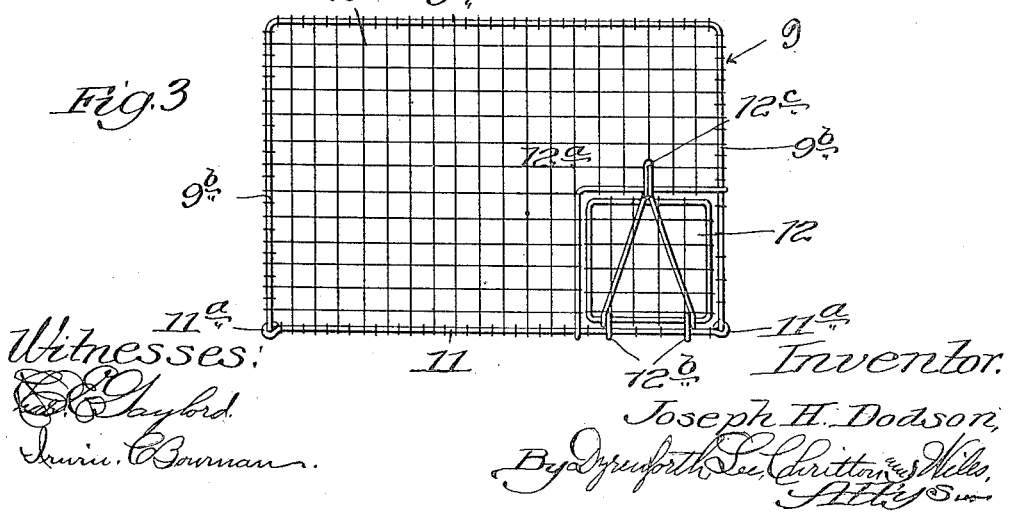
Witnesses:
Inventor.
Joseph H. Dodson,
By Dyrenforth, Lee, Chritton and Wiles,
Attys.

J. H. DODSON.
TRAP.
APPLICATION FILED MAY 6, 1914.

1,222,191.

Patented Apr. 10, 1917.
2 SHEETS—SHEET 2.

Witnesses:

Inventor:
Joseph H. Dodson

UNITED STATES PATENT OFFICE.

JOSEPH H. DODSON, OF CHICAGO, ILLINOIS.

TRAP.

1,222,191.

Specification of Letters Patent.

Patented Apr. 10, 1917.

Application filed May 6, 1914. Serial No. 836,829.

*To all whom it may concern:*

Be it known that I, JOSEPH H. DODSON, a citizen of the United States, residing at Chicago, in the county of Cook and State of Illinois, have invented a new and useful Trap, of which the following is a specification.

My invention relates particularly to bird traps of wire fabric combined construction; and my primary object is to provide a trap of the character indicated which shall be cheap, of thoroughly durable construction, and possessed of improved means for preventing the escape of the birds trapped.

The invention is illustrated in its preferred embodiment in the accompanying drawings, in which—

Figure 4:
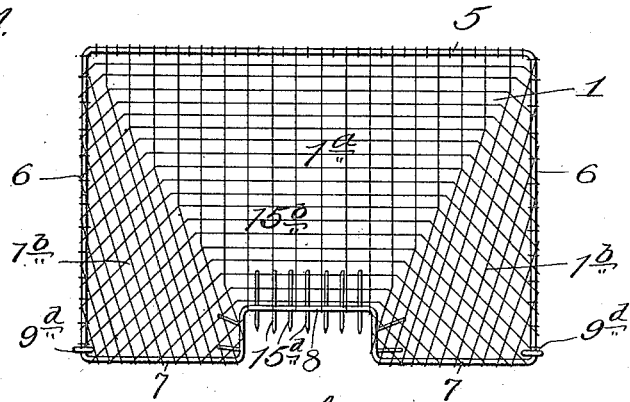
Figure 5:
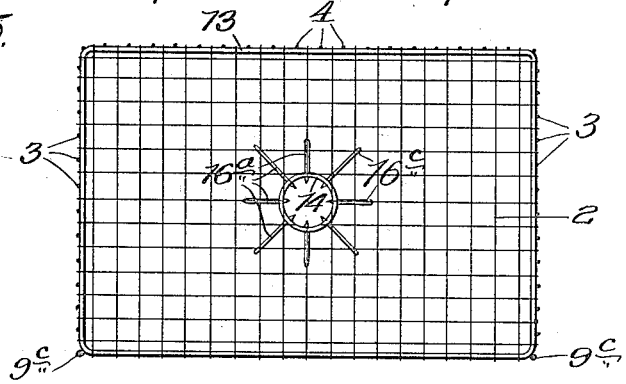
Figure 6:
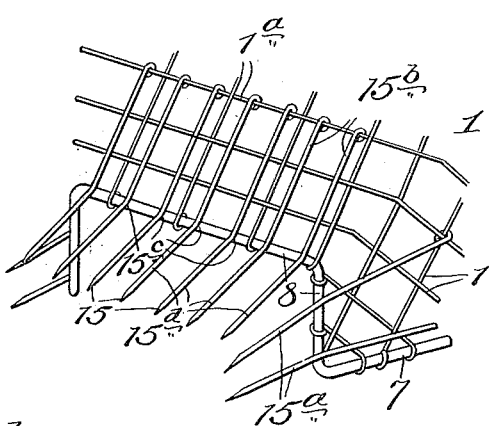

Figure 1 represents a plan view of a bird trap constructed in accordance with my invention; Fig. 2 a longitudinal sectional view of the same, taken as indicated at line 2 of Fig. 1; Fig. 3 is a rear end elevational view of the trap; Fig. 4 a front end elevational view of the trap; Fig. 5 a sectional view taken as indicated at line 5 of Fig. 2; Fig. 6 a broken perspective view, showing the construction at the point of the half-funnel employed at the entrance to the antechamber of the trap; and Fig. 7, a perspective view showing the construction at the apex of the full entrance funnel of the final or confining chamber of the trap.

The trap preferably comprises an elongated rectangular body having an ante chamber A and a confining chamber B, the chamber A being provided with a half-funnel entrance 1 and the chamber B being provided with a full funnel entrance 2.

The sides 3 and top 4 of the trap are preferably formed integrally with each other, being composed of a light wire fabric, or high grade wire netting bent into U-form, that is, in cross section of the trap.

At the front end of the trap, I provide (Figs. 1, 4, and 6) a rod-form end frame comprising a top member 5, vertical members 6, obliquely extending base members 7, and a rectangular arch 8, the whole being formed of a rod bent to suitable shape and having its ends electric-welded, so that the parts enumerated are of integral construction. The arch 8 is a U-shaped member similar to, but much smaller than the U-shaped member composed of the top rod 5 and vertical corner rods 6. The half-funnel 1 comprises a sloping top 1ª and obliquely extending sides 1ᵇ, formed by bending a piece of wire fabric to proper shape. The front end of the half-funnel thus formed is connected with the arch 8, and the rear end is connected with the arch composed of the member 5 and the vertical members 6. The front end of the fabric composing the body of the cage is connected with the cross rod 5 and vertical rods 6. Thus, the half-funnel extends within the chamber A. The half-funnel and the chamber A may be open at the lower side, the trap being adapted to rest upon the ground.

A rear end, rod-form, U-shaped frame member 9 is employed, thus comprising a top member 9ª and vertical corner members 9ᵇ. The members 9ᵇ are bent forwardly at their lower ends and extended to the front end of the trap, thus affording longitudinal base members 9ᶜ. The lower edges of the fabric side pieces 3 are connected with the rods 9ᶜ, and the rear end of the fabric forming the body of the trap is connected with the rear cross member 9ª and vertical corner members 9ᵇ.

The front ends of the side member 9ᶜ are provided with eyes 9ᵈ connected with the lower portions of the front corner rods 6.

A rear end fabric frame is connected with the U-shaped rear frame 9 and with the lower cross rod 11, which is joined by eyes 11ª to the lower portion of the frame 9.

The rear end of the trap is provided with an inwardly swinging door 12 disposed within a frame rod 12ª at one of the lower corners of the trap. The door 12 is pivoted at 12ᵇ and is provided at its upper end with a releasable latch 12ᶜ, which engages the top member of the frame 12ª. When desired, the door 12 may be swung inwardly, and a small rectangular receiving cage, which may be made of wire fabric, may be applied at the door opening, so that the trapped birds may be driven from the chamber B into the receiving cage.

Within the body of the trap is a rectangular rod-formed frame member 13, to which the front edge of the fabric funnel 2 is secured. The frame 13 is securely fastened to the side and top fabrics 3 and 4 forming the body of the cage. The funnel tube is formed by bowing a rectangular piece of wire fabric into a funnel form, the funnel extending into the chamber B and being provided centrally with a perforation in which is firmly secured a wire ring 14.

Figure 7:
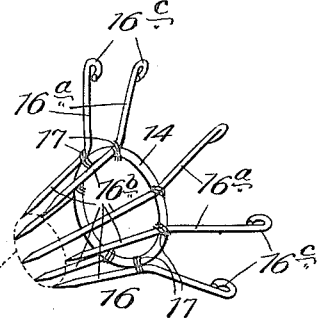

As shown in Figs. 6 and 7, the rear or small end of the half-funnel is provided with pointed guard members 15 and 15ᵃ; and the rear or small end of the funnel 2 is provided with pointed guard members 16.

The guard members 15 and 15ᵃ comprise heavy gage, comparatively soft wires which are capable of being readily bent. Each impaling member 15 comprises a shank portion 15ᵇ having its upper portions secured, by a loop or knot, to one of the fabric wires of the funnel 1, and having its lower portion secured at 15ᶜ to the top portion of the arch rod 8; and a projecting pointed portion 15ᵇ, which extends at an angle to the shank portion 15ᵈ. That is to say, the slope of the portions 15ᵈ of the members 15 is less pronounced than the slope of the shank portions 15ᵇ. The lateral impaling members or guards 15ᵃ have their intermediate portions welded to the vertical members of the arch 8 and have their rear ends looped or connected to the fabric 1.

Each of the prongs 16 of the funnel 2 guarding against return from the confining chamber B comprises a shank portion 16ᵃ and a projecting point portion 16ᵇ. The point portions of these members are at an angle to the shank portions, and the members are connected at the bending points with the wire ring 14. Connection is made by means of wire ties 17 and the parts are welded thereat. The rear ends of the shanks 16ᵃ are connected with the fabric of the funnel 2, and by means of loops 16ᶜ. The members 16 are preferably of relatively stiff wire, so that the impaling prongs will not be bent from their proper position. The points of the members 16 are arranged in a circle, as indicated at 18, this circle being of less diameter than the ring 14.

It is preferred to provide the bottom of the chamber B with a fabric 19, but, as indicated above the chamber A is left open at the bottom.

I have shown the upper central portion of the body of the trap equipped with cross rod 20 at the central portion of which is applied a handle 21. The handle is so applied that the trap will balance when it is lifted.

It is understood that when in use, the trap will be placed upon the ground in the position shown in Figs. 1 and 2. A small quantity of feed may be placed on the ground and in the chamber A, and feed may be placed in the chamber B. Thus, the birds may be tempted through the half-funnel 1, and finally through the inner funnel 2 into the chamber B, from whence they cannot return. The guard members 15 and front funnel 1 may be bent close enough to the ground to prevent the return of birds entering the chamber A. If the trap is resting on the grass the members 15 may be adjusted according to necessity. The rigid members 16 have their points so disposed as to admit, but prevent the return of birds entering the confining chamber B. For example, if the diameter of the circle 18 is seven-eighths of an inch it is sufficient to admit the average English sparrow, but would prevent the entrance of a wren. It has been found that the difference of an eighth of an inch in the diameter of the circle is sufficient to prevent the entrance of another species.

From the foregoing it will be understood that a trap of this character should be constructed with exactness, and should, while being of open work material, such as close mesh wire fabric, nevertheless be durably constructed and possess sufficient rigidity to withstand the conditions of use to which it is subjected. The trap should be so designed as to admit the birds which are to be captured, and, so far as possible, exclude the birds which are to be preserved. These purposes are effectively gained by means of the improved construction herein described.

Experience has demonstrated that a trap of this character is well adapted to the capture of the English sparrow, which has proven so great a pest in this as well as other countries. The trap is durable and strong, the parts being electrically welded throughout.

What I regard as new and desire to secure by Letters Patent, is:

1. A trap comprising a body portion composed of wire fabric, a fabric funnel dividing the same into an ante-chamber and a confining chamber, a rod bent to form a large U-shaped member and a small U-shaped member joined by obliquely extending base-members, the large U-shaped member having joined thereto the front end of the fabric comprising the body of the trap, and a fabric funnel having its rear end connected with the large U-shaped member, the lower edges of its sides connected with the oblique base members and its front portion connected with the small U-shaped member.

2. A trap comprising a front frame member consisting of a large U-shaped member, and a small U-shaped member and oblique base members joining the lower extremities of the arms of said U-shaped members, a frame member comprising a rear U-shaped member having its arms bent to afford longitudinal base members, a wire fabric U-shaped in cross-section having its front end connected to the large U-shaped member of the front frame and having its rear ends connected to the rear end frame member, and having the lower edges of its side members connected to said longitudinal base members, a fabric funnel dividing the trap into an ante-chamber and a confining chamber, a fabric funnel connected with the front frame member, and pointed wire guards secured to the fabric of said last mentioned funnel and to the small U-shaped part of the front frame member.

JOSEPH H. DODSON.

In presence of—
L. HEISLAR,
D. C. THORSEN.

Copies of this patent may be obtained for five cents each, by addressing the "Commissioner of Patents, Washington, D. C."